(12) United States Patent
Yasuda

(10) Patent No.: US 12,390,876 B2
(45) Date of Patent: Aug. 19, 2025

(54) RESISTANCE SPOT WELDING APPARATUS

(71) Applicant: FUTABA INDUSTRIAL CO., LTD., Okazaki (JP)

(72) Inventor: Keigo Yasuda, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 907 days.

(21) Appl. No.: 17/547,987

(22) Filed: Dec. 10, 2021

(65) Prior Publication Data

US 2022/0226924 A1 Jul. 21, 2022

(30) Foreign Application Priority Data

Jan. 20, 2021 (JP) ................................. 2021-007122

(51) Int. Cl.
 *B23K 11/30* (2006.01)
 *B23K 11/11* (2006.01)
 *B23K 11/31* (2006.01)

(52) U.S. Cl.
 CPC ......... *B23K 11/115* (2013.01); *B23K 11/3009* (2013.01)

(58) Field of Classification Search
 CPC .... B23K 11/115; B23K 11/11; B23K 11/3009
 See application file for complete search history.

(56) References Cited

U.S. PATENT DOCUMENTS

| | | | |
|---|---|---|---|
| 5,115,113 A * | 5/1992 | Miller | B23K 11/31 219/89 |
| 5,958,262 A * | 9/1999 | Palko | B23K 11/317 219/89 |

(Continued)

FOREIGN PATENT DOCUMENTS

| | | |
|---|---|---|
| DE | 102008017634 A1 | 10/2009 |
| EP | 0031800 B1 | 12/1983 |

(Continued)

OTHER PUBLICATIONS

Office Action for Chinese Patent Application No. 202210060709.5, mailed Sep. 27, 2023, 10 pages.

(Continued)

*Primary Examiner* — Ibrahime A Abraham
*Assistant Examiner* — Lawrence H Samuels
(74) *Attorney, Agent, or Firm* — Withrow + Terranova, PLLC; Vincent K. Gustafson

(57) ABSTRACT

One aspect of the present disclosure is a resistance spot welding apparatus for welding a workpiece made of layered metallic plates. The resistance spot welding apparatus includes a first electrode; a second electrode arranged such that the workpiece is interposed between the first electrode and the second electrode; and a pressure mechanism that applies pressure to the first electrode towards the first metallic plate by air. The pressure mechanism includes a piston coupled to the first electrode; a cylinder having an inner space that accommodates the piston; a first ventilation unit that supplies the inner space with air for applying pressure to the first electrode; and a second ventilation unit that discharges air from the inner space as pressure is applied to the first electrode. At least one of the first ventilation unit or the second ventilation unit includes two or more air passages that communicate with the inner space.

3 Claims, 4 Drawing Sheets

(56) References Cited

U.S. PATENT DOCUMENTS

| | | | |
|---|---|---|---|
| 6,198,065 B1* | 3/2001 | Vollmers | B23K 11/314 219/89 |
| 2020/0276665 A1* | 9/2020 | Murayama | B23K 11/36 |
| 2020/0355203 A1* | 11/2020 | Takada | F15B 21/04 |

FOREIGN PATENT DOCUMENTS

| | | |
|---|---|---|
| JP | H03106277 U | 11/1991 |
| JP | H07214339 A | 8/1995 |
| JP | 2000135573 A | 5/2000 |
| JP | 2002059269 A | 2/2002 |
| JP | 2010207903 A | 9/2010 |
| JP | 2010247215 A | 11/2010 |
| JP | 6094306 B2 | 3/2017 |
| JP | 6345013 B2 | 6/2018 |
| JP | 2019044952 A | 3/2019 |
| WO | 2019124464 A1 | 6/2019 |

OTHER PUBLICATIONS

Notice of Reasons for Refusal for Japanese Patent Application No. 2021007122, mailed Jan. 10, 2023, 6 pages.
Notice of Reasons for Refusal for Japanese Patent Application No. 2021007122, mailed Jun. 27, 2023, 6 pages.
Notice of Reasons for Rejection for Chinese Patent Application No. 202210060709.5, mailed Jun. 26, 2024, 10 pages including English translation.
Second Office Action for Chinese Patent Application No. 202210060709.5, mailed Mar. 22, 2024, 14 pages.
Office Action for German Patent Application No. 102022100703.0, mailed Mar. 26, 2025, 10 pages.

* cited by examiner

RESISTANCE SPOT WELDING APPARATUS

CROSS-REFERENCE TO RELATED APPLICATIONS

This application claims the benefit of Japanese Patent Application No. 2021-007122 filed on Jan. 20, 2021 with the Japan Patent Office, the entire disclosure of which is incorporated herein by reference.

BACKGROUND

The present disclosure relates to a resistance spot welding apparatus.

In apparatuses for performing a resistance spot welding on a workpiece made of layered metallic plates such as steel plates, a publicly known configuration is to apply pressure to an electrode, which is being welded, by air pressure produced by a pneumatic cylinder such that the electrode is pressed against the metallic plates (see, Japanese Unexamined Patent Application Publication No. 2002-059269).

By thus applying pressure to the electrode towards the metallic plates, an area of contact between the electrode and the metallic plates after completion of the welding increases. As a result, a cooling speed of the metallic plates is improved, and a fracture of the metallic plate after the welding can be reduced.

In addition, by using the pneumatic cylinder as a pressure mechanism, the cost of the welding apparatus can be reduced compared with a case of using a servomotor.

SUMMARY

Resistance spot welding, in which air pressure is applied to an electrode, the electrode is pushed into a metallic plate as the metallic plate is softened during the welding. When this happens, the pressure applied on the metallic plate by the electrode drops due to decrease in the pressure inside a pneumatic cylinder, which causes a lack of stability in the pressure application. It consequently generates spatters that may cause welding failures.

Preferably, one aspect of the present disclosure is to provide a resistance spot welding apparatus that can apply air pressure to an electrode while reducing the welding failures.

One aspect of the present disclosure is a resistance spot welding apparatus configured to weld a workpiece made of layered metallic plates. The resistance spot welding apparatus includes a first electrode configured to contact a first metallic plate among the metallic plates; a second electrode configured to contact a second metallic plate among the metallic plates, the second electrode being arranged such that the workpiece is interposed between the first electrode and the second electrode; and a pressure mechanism configured to apply pressure to the first electrode towards the first metallic plate by air.

The pressure mechanism includes a piston coupled to the first electrode; a cylinder having an inner space that accommodates the piston; a first ventilation unit configured to supply the inner space with air for applying pressure to the first electrode; and a second ventilation unit configured to discharge air from the inner space as pressure is applied to the first electrode. At least one of the first ventilation unit or the second ventilation unit includes two or more air passages that are independent from one another and communicate with the inner space.

This configuration increases amount of air supply or air discharge into or from the cylinder of the pressure mechanism when applying pressure to the first electrode with two or more air passages. As a result, time to apply pressure to the first electrode is reduced.

In other words, this configuration reduces a time to recover the pressure the first electrode applying to the first metallic plate after the first electrode is pushed into the softened first metallic plate. As a result, the welding failures caused by generation of spatters can be reduced.

In one aspect of the present disclosure, tensile strength of at least one of the first metallic plate or the second metallic plate may be 1800 MPa or more. This configuration can precisely reduce the welding failures caused by generation of spatters on a high tension metallic plate, which requires a high-pressure push with the electrode when welding and thus is prone to have spatters generated due to decrease in pressure.

In one aspect of the present disclosure, the first ventilation unit may include two or more air passages that are independent from one another and communicate with the inner space. This configuration can precisely reduce the time to apply pressure to the first electrode.

BRIEF DESCRIPTION OF THE DRAWINGS

An example embodiment of the present disclosure will be described hereinafter by way of example with reference to the accompanying drawings, in which.

DETAILED DESCRIPTION OF EXEMPLARY EMBODIMENTS

1. First Embodiment

[1-1. Configuration]

Figure 1:
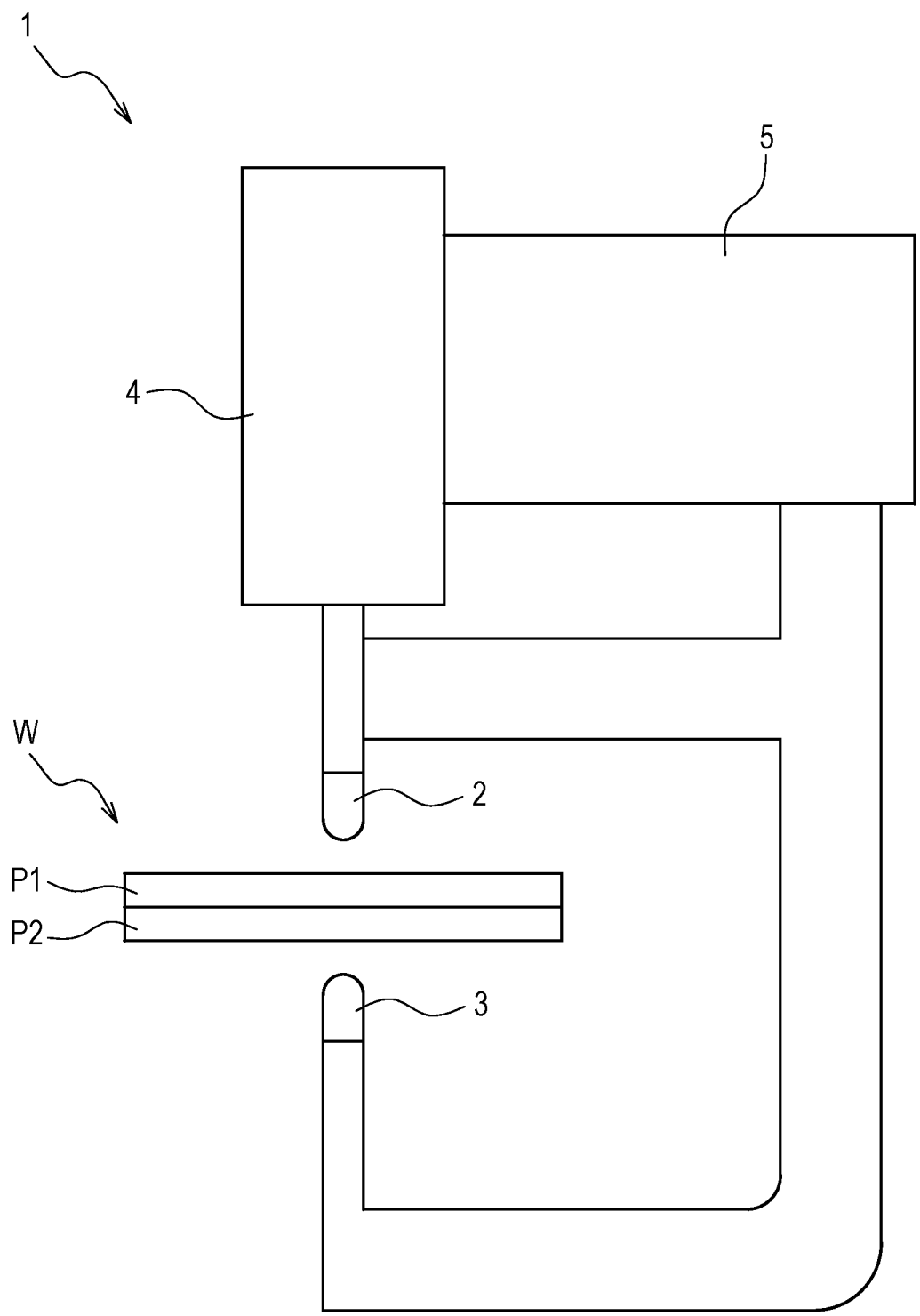
FIG. 1 is a schematic drawing of a resistance spot welding apparatus of an embodiment.

A resistance spot welding apparatus 1 shown in FIG. 1 is configured to weld a workpiece W made of layering a first metallic plate P1 and a second metallic plate P2.

In the present embodiment, the first metallic plate P1 is placed over the second metallic plate P2. Materials for the first metallic plate P1 and the second metallic plate P2 are not limited to particular materials and are, for example, steel plates such as stainless aluminum-plated steel plates. At least one of the first metallic plate P1 or the second metallic plate P2 has a tensile strength of 1800 MPa or more and 3000 MPa or less.

The resistance spot welding apparatus 1 performs a resistance sport welding on the first metallic plate P1 and the second metallic plate P2, arranged as the workpiece W, in a thickness direction. The resistance spot welding apparatus 1 includes a first electrode 2, a second electrode 3, a pressure mechanism 4, and a main body 5.

<Electrode>

The first electrode 2 is arranged above the workpiece W and is configured to contact a surface of the first metallic plate P1.

The second electrode 3 is arranged below the workpiece W and is configured to contact a surface of the second metallic plate P2. The second electrode 3 is also configured to have the workpiece W interposed between the first electrode 2 and the second electrode 3 and to apply a pressure to the workpiece W in the thickness direction.

The first electrode 2 is movable relative to the second electrode 3 in a vertical direction. In the present embodiment, a direction the workpiece W is interposed between the first electrode 2 and the second electrode 3 (that is, a moving direction of the first electrode 2 and/or the second electrode 3) is parallel to the vertical direction.

A welding current flows between the first electrode 2 and the second electrode 3, where the workpiece is interposed, via the workpiece W. The first electrode 2 and the second electrode 3 weld the first metallic plate P1 with the second metallic plate P2 while interposing the workpiece W and applying pressure to the interposed workpiece W in the thickness direction.

<Pressure Mechanism>

Figure 2:
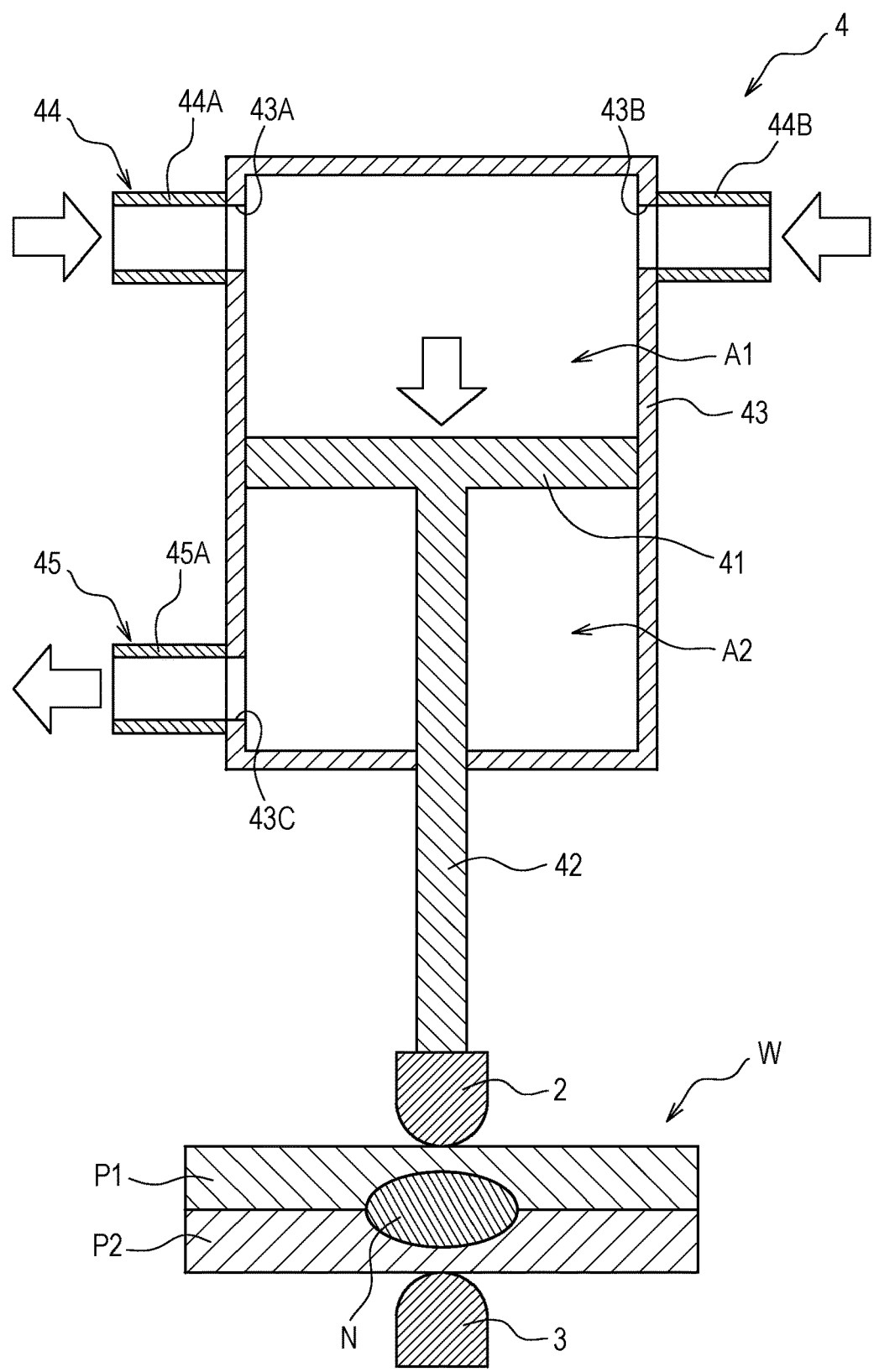
FIG. 2 is a schematic cross-sectional view of electrodes and a pressure mechanism of the resistance spot welding apparatus of FIG. 1.

The pressure mechanism 4 is configured to apply pressure to the first electrode 2 towards the first metallic plate P1 by air. As shown in FIG. 2, the pressure mechanism 4 includes a piston 41, a rod 42, a cylinder 43, a first ventilation unit 44, and a second ventilation unit 45.

The piston 41 is coupled to the first electrode 2 via the rod 42. The piston 41 is accommodated inside the inner space of the cylinder 43 so as to be reciprocable in an axial direction of the cylinder 43.

The rod 42 is coupled to the piston 41 and reciprocates with the piston 41 in the axial direction of the cylinder 43. An end portion of the rod 42 opposite the piston 41 penetrates a bottom wall at a lower end of the cylinder 43 and is coupled to the first electrode 2.

The cylinder 43 includes the inner space in which the piston 41 is accommodated. The axial direction of the cylinder 43 is parallel to the vertical direction (that is, the thickness direction of the workpiece W). The cylinder 43 includes a first aperture 43A, a second aperture 43B, and a third aperture 43C for communicating the inner space with an exterior of the cylinder 43.

The inner space of the cylinder 43 is divided into a first region A1 and a second region A2 by the piston 41. The first aperture 43A and the second aperture 43B are arranged in a vicinity of an upper end of the cylinder 43 and is communicated with the first region A1. The third aperture 43C is arranged in a vicinity of the lower end of the cylinder 43 and is communicated with the second region A2.

The first region A1 is positioned above the piston 41. When air is supplied from the first aperture 43A and the second aperture 43B into the first region A1, the first region A1 is inflated, which causes the piston 41 to move towards the lower end of the cylinder 43, increasing an extent of protrusion of the rod 42 from the cylinder 43. As a result, a pressure is applied to the first electrode 2.

The second region A2 is positioned below the piston 41. When air is supplied from the third aperture 43C into the second region A2, the second region A2 is inflated, which causes the piston 41 to move away from the lower end of the cylinder 43, decreasing the extent of protrusion of the rod 42 from the cylinder 43. As a result, the pressure applied to the first electrode 2 is reduced.

When the first region A1 is inflated, air is discharged from the second region A2 to deflate the second region A2 and to move the piston 41 downwardly. Reversely, when the second region A2 is inflated, air is discharged from the first region A1, and the second region A2 is inflated to move the piston 41 upwardly.

The first aperture 43A and the second aperture 43B are positioned above the uppermost part of the piston 41. The third aperture 43C is positioned below the lowermost part of the piston 41.

The first ventilation unit 44 is configured to supply the inner space of the cylinder 43 with air that is used for applying pressure to the first electrode 2. The first ventilation unit 44 includes a first air passage 44A and a second air passage 44B.

The first air passage 44A is coupled to the first aperture 43A of the cylinder 43. The second air passage 44B is coupled to the second aperture 43B of the cylinder 43. The first air passage 44A and the second air passage 44B are each coupled to both an air supply system and an air discharge system. The first air passage 44A and the second air passage 44B supply air and discharge air to and from the first region A1 of the inner space of the cylinder 43 via the first aperture 43A or the second aperture 43B. The first air passage 44A and the second air passage 44B are independent from one another. More specifically, the first air passage 44A and the second air passage 44B are not directly coupled to each other.

In the present embodiment, the first air passage 44A and the second air passage 44B are arranged such that their air-supply directions face each other in a radial direction of the cylinder 43. In other words, the first aperture 43A and the second aperture 43B are situated to face each other.

However, the air-supply directions of the first air passage 44A and the second air passage 44B do not always have to face each other. Furthermore, the first air passage 44A and the second air passage 44B may be misaligned in the axial direction of the cylinder 43.

The second ventilation unit 45 is configured to discharge air from the inner space of the cylinder 43 as pressure is applied to the first electrode 2 (that is, along with supply of air into the first region A1). The second ventilation unit 45 includes a third air passage 45A.

The third air passage 45A is coupled to the third aperture 43C of the cylinder 43. The third air passage 45A is coupled to both the air supply system and the air discharge system. The third air passage 45A supplies air and discharges air to and from the second region A2 of the inner space of the cylinder 43 via the third aperture 43C.

<Main Body>

The main body 5 has functions such as, to supply the welding current to the first electrode 2 and the second electrode 3, and to adjust pressure between the first electrode 2 and the second electrode 3 applied by the pressure mechanism 4.

[1-2. Method of Manufacturing]

Explained next is a method of resistance spot welding using the resistance spot welding apparatus 1 shown in FIG.

1. The method of resistance spot welding includes an arrangement step and a welding step.

<Arrangement Step>

In this step, the work piece W, made by layering the first metallic plate P1 and the second metallic plate P2 in the thickness direction, is arranged between the first electrode 2 and the second electrode 3 of the resistance spot welding apparatus 1.

<Welding Step>

In this step, the first metallic plate P1 and the second metallic plate P2 layered on one another are welded by the resistance spot welding apparatus 1. In this step, pressure is applied to the first electrode 2 towards the first metallic plate P1 (that is, towards the second electrode 3) by the pressure mechanism 4 during welding.

Figure 3A:
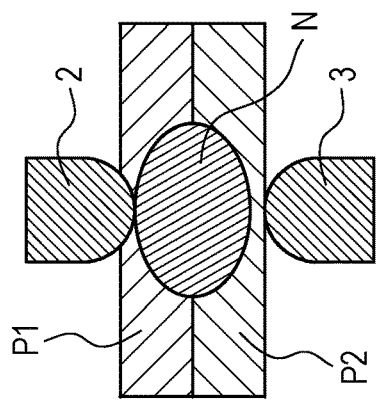
FIG. 3A is a schematic cross-sectional view of the electrodes and metallic plates during welding.
Figure 3B:
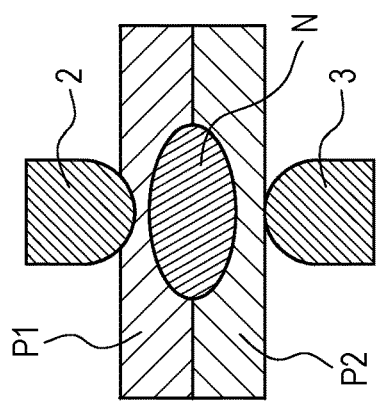
FIG. 3B is a schematic cross-sectional view of the electrodes and the metallic plates during welding.

As shown in FIG. 3A, the metallic plate is not softened immediately after the welding is initiated; thus, the first electrode 2 touches the surface of the first metallic plate P1. As the welding progresses, as shown in FIG. 3B, a nugget N is formed at a boundary of the first metallic plate P1 and the second metallic plate P2.

Figure 3C:
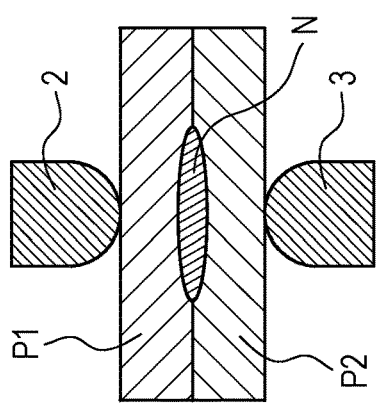
FIG. 3C is a schematic cross-sectional view of the electrodes and the metallic plates during welding.
Figure 3D:
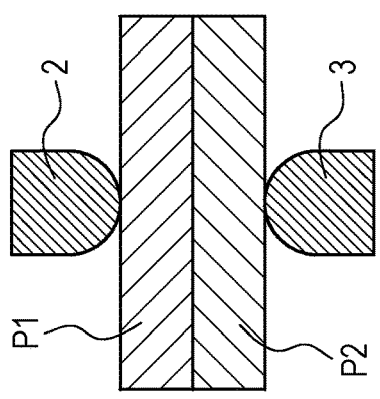
FIG. 3D is a schematic cross-sectional view of the electrodes and the metallic plates during welding.

As the welding further progresses, as shown in FIG. 3C, the nugget N grows and the first metallic plate P1 is softened. Accordingly, a leading end of the first electrode 2, applied with pressure by the pressure mechanism 4, thrusts into the first metallic plate P1. As shown in FIG. 3D, the welding is completed when the nugget N has grown sufficiently. Application of pressure to the first electrode 2 continues until the completion of the welding.

Figure 3E:
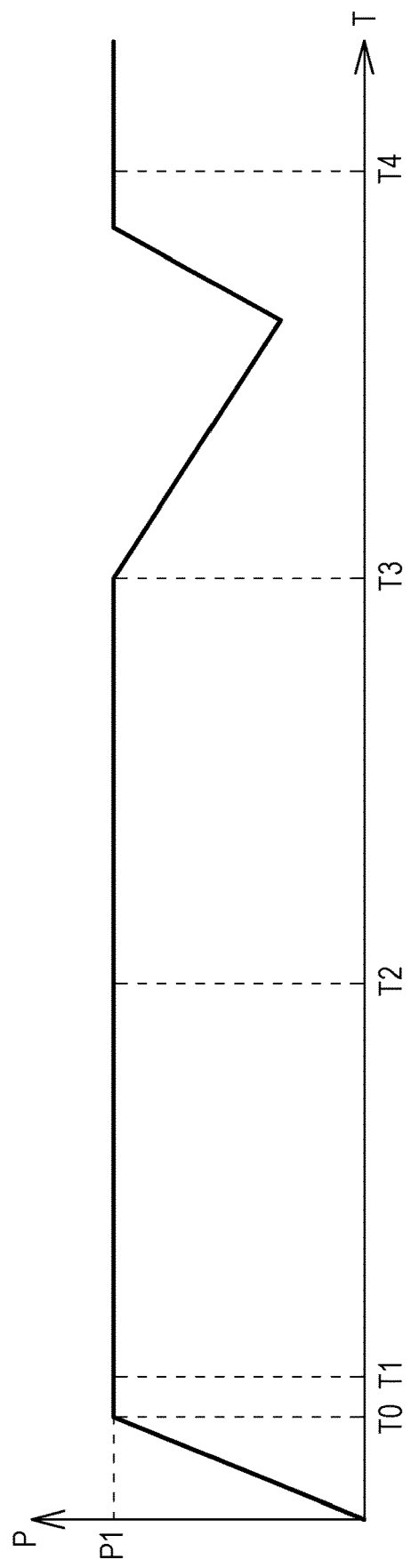
FIG. 3E is a graph showing one example of changes in pressure applied to the first electrode during welding.

FIG. 3E shows one example of changes in pressure applied to the first electrode 2 from the beginning to the completion of the welding. The graph in FIG. 3E shows time T on its horizontal axis and pressure P on its vertical axis. Times T1, T2, T3, and T4 in the graph respectively show when the conditions of FIGS. 3A, 3B, 3C, and 3D occur.

The welding of the workpiece W starts at a time T0 when the pressure has risen to a set pressure P1. Then, after the time T3, the piston 41 in the cylinder 43 moves downwardly as the first electrode 2 thrusts into the first metallic plate P1. This causes a decrease in the pressure inside the inner space of the cylinder 43; and thus the pressure applied to the first electrode 2 is also decreased.

Meanwhile, in response to the decrease in the pressure inside the inner space of the cylinder 43, air is supplied to the first region A1 through the first air passage 44A and the second air passage 44B of the first ventilation unit 44. Consequently, the pressure in the first region A1 is immediately recovered back to the set pressure P1.

[1-3. Effects]

The embodiment described above in detail renders the following effects.

(1a) In the cylinder 43 of the pressure mechanism 4, the amount of air supply or air discharge increases when applying pressure to the first electrode 2 through the first air passage 44A and the second air passage 44B. This shortens the time for applying pressure to the first electrode 2.

In other words, this shortens the time for recovering the pressure applied to the first electrode 2 towards the first metallic plate P1 after the first electrode 2 is pressed into the softened first metallic plate P1. Accordingly, welding failures caused by generation of spatters can be reduced.

(1b) When using a high tension metallic plate, which requires high pressure to press the electrode during welding and thus is likely to generate spatters due to pressure decrease, the welding failures caused by generation of spatters can be precisely reduced.

(1c) By having the first ventilation unit 44 formed of the first air passage 44A and the second air passage 44B that communicate with the inner space of the cylinder 43, the time for applying pressure to the first electrode 2 can be precisely shortened.

2. Other Embodiments

An embodiment of the present disclosure has been explained above.

Nevertheless, the present disclosure can be carried out in various modifications without being limited to the aforementioned embodiment.

Figure 4A:
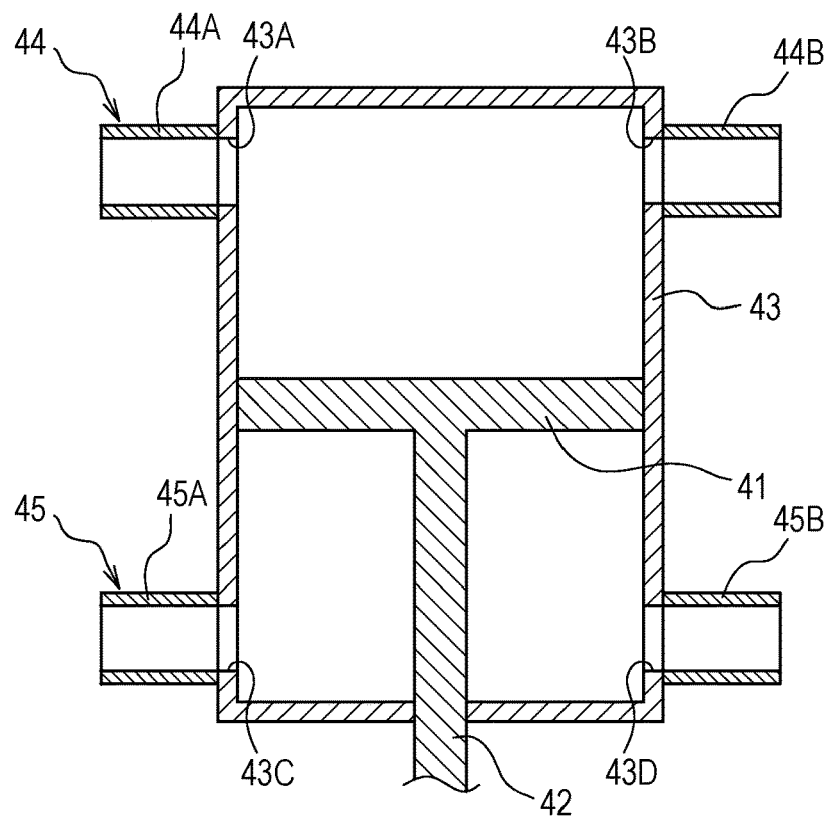
FIG. 4A is a schematic cross-sectional view of a pressure mechanism of an embodiment different from the embodiment of FIG. 2.

(2a) In the resistance spot welding apparatus of the aforementioned embodiment, the first ventilation unit may include three or more air passages. And, the second ventilation unit may include two or more air passages that are independent from one another. For example, as shown in FIG. 4A, the cylinder 43 may further include a fourth aperture 43D, and the second ventilation unit 45 may further include a fourth air passage 45B communicated with the fourth aperture 43D.

Figure 4B:
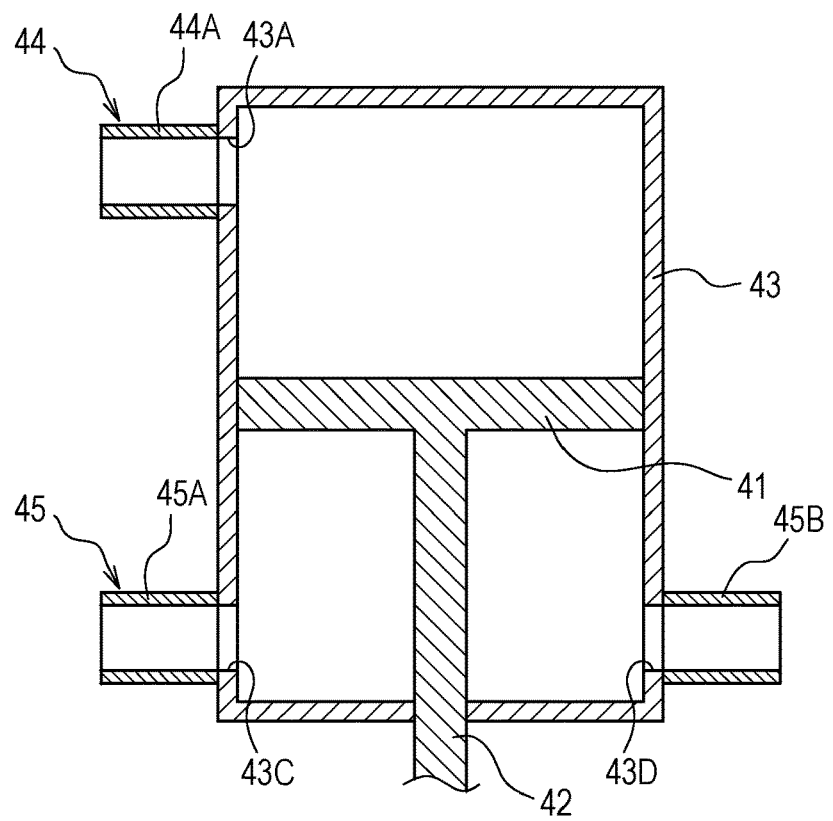
FIG. 4B is a schematic cross-sectional view of a pressure mechanism of an embodiment different from the embodiment of FIG. 2.

Furthermore, when the second ventilation unit includes two or more air passages, the first ventilation unit is not always required to include two or more air passages. For example, as shown in FIG. 4B, while the second ventilation unit 45 includes the third air passage 45A and the fourth air passage 45B, the first ventilation unit 44 may include only the first air passage 44A.

(2b) In the resistance spot welding apparatus of the aforementioned embodiment, pressure may be applied to both of the first electrode and the second electrode by air. In other words, the resistance spot welding apparatus may also include a pressure mechanism that applies pressure to the second electrode towards the second metallic plate.

(2c) In the resistance spot welding apparatus of the aforementioned embodiment, a workpiece made by layering three or more metallic plates may be used. In other words, one or more metallic plates may be placed between the first metallic plate and the second metallic plate.

(2d) In the resistance spot welding apparatus of the aforementioned embodiment, the direction to interpose the workpiece between the first electrode and the second electrode is not always required to be the vertical direction. The direction to interpose the workpiece may be a horizontal direction, or a direction that crosses both the vertical direction and the horizontal direction.

(2e) In the resistance spot welding apparatus of the aforementioned embodiment, the tensile strength of both of the first metallic plate and the second metallic plate may be less than 1800 MPa.

(2f) Functions of one element in the aforementioned embodiments may be achieved by two or more elements. Functions of two or more elements may be integrated into one element. A part of the configuration in the aforementioned embodiments may be omitted. At least a part of the configuration in the aforementioned embodiments may be added to or replaced with other part of the configuration in the aforementioned embodiments. It should be noted that any and all modes included in the technical ideas that are identified by the languages recited in the claims are embodiments of the present disclosure.

What is claimed is:

1. A resistance spot welding apparatus configured to weld a workpiece made of layered metallic plates, the resistance spot welding apparatus comprising:

a first electrode configured to contact a first metallic plate among the metallic plates;

a second electrode configured to contact a second metallic plate among the metallic plates, the second electrode being arranged such that the workpiece is interposed between the first electrode and the second electrode; and a pressure mechanism configured to apply air pressure to the first electrode towards the first metallic plate, wherein the pressure mechanism comprises:
 a piston coupled to the first electrode;
 a cylinder having an inner space that accommodates the piston;
 a first ventilation unit configured to supply the inner space with air for applying air pressure to the first electrode;
 a second ventilation unit configured to discharge air from the inner space as air pressure is applied to the first electrode; and
 an air supply system configured to supply air to the first ventilation unit and permit discharge of air from the second ventilation unit, wherein the first ventilation unit comprises first and second air passages independent from each other, communicating with the inner space, and respectively coupled to first and second apertures that are provided in the cylinder and face each other in a radial direction of the cylinder, and wherein the second ventilation unit comprises third and fourth air passages independent from each other, communicating with the inner space, and respectively coupled to third and fourth apertures that are provided in the cylinder and face each other in a radial direction of the cylinder.

2. The resistance spot welding apparatus according to claim 1, wherein tensile strength of at least one of the first metallic plate or the second metallic plate is 1800 MPa or more.

3. The resistance spot welding apparatus according to claim 1, wherein the first ventilation unit comprises three or more air passages that are independent from each other.

* * * * *